US009596571B1

(12) United States Patent
Gordon et al.

(10) Patent No.: US 9,596,571 B1
(45) Date of Patent: Mar. 14, 2017

(54) ESTIMATING THE LOCATION OF A WIRELESS TERMINAL BASED ON RADIO-FREQUENCY PATTERN MATCHING AND COOPERATIVE MEASUREMENTS

(71) Applicants: Polaris Wireless, Inc., Mountain View, CA (US); Virginia Polytechnic Institute and State University, Blacksburg, VA (US)

(72) Inventors: Scot Douglas Gordon, Redmond, WA (US); Sayed Reza Monir Vaghefi, Blacksburg, VA (US); R. Michael Buehrer, Blacksburg, VA (US)

(73) Assignees: Polaris Wireless, Inc., Mountain View, CA (US); Virginia Polytechnic Institute & State University, Blacksburg, VA (US)

( * ) Notice: Subject to any disclaimer, the term of this patent is extended or adjusted under 35 U.S.C. 154(b) by 58 days.

(21) Appl. No.: 14/572,070

(22) Filed: Dec. 16, 2014

Related U.S. Application Data (60) Provisional application No. 62/035,270, filed on Aug. 8, 2014.

(51) Int. Cl.
*H04W 24/00* (2009.01)
*H04W 4/02* (2009.01)

(52) U.S. Cl.
CPC .................................. *H04W 4/025* (2013.01)

(58) Field of Classification Search
CPC ...................................................... H04W 4/025
See application file for complete search history.

(56) References Cited

U.S. PATENT DOCUMENTS

| | | | |
|---|---|---|---|
| 8,417,264 B1 * | 4/2013 | Whitney | H04W 64/00 455/456.1 |
| 2007/0121560 A1 * | 5/2007 | Edge | H04W 64/00 370/338 |

OTHER PUBLICATIONS

Henk Wymeersch et al., "Cooperative Localization in Wireless Networks", DOI: 10.119/JPROC.2008.2008853, "Proceedings of the IEEE", dated Mar. 18, 2009, pp. 427-450, vol. 97, No. 2, Publisher: IEEE, Published in: US.

(Continued)

*Primary Examiner* — Kashif Siddiqui
*Assistant Examiner* — Minjung Kim
(74) *Attorney, Agent, or Firm* — Kaplan Breyer Schwarz & Ottesen, LLP (57) ABSTRACT

A method for estimating the location of a wireless terminal is disclosed that is based on using: the known location of one or more devices, empirical data that indicates the relative position of the wireless terminal to the devices, and empirical data that indicates the relative position of the wireless terminal (which is at an unknown location) relative to other wireless terminals that are also at unknown locations.

6 Claims, 5 Drawing Sheets

(56) References Cited

OTHER PUBLICATIONS

Reza Monir Veghefi et al., "Cooperative Received Signal Strength-Based Sensor Localization With Unknown Transmit Powers", DOI: 10.1109/TSP.2012.2232664, "IEEE Transactions on Signal Processing", dated Mar. 15, 2013, vol. 61, No. 6, Publisher: IEEE, Published in: US.

Reza Monir Vaghefi et al., "Cooperative Sensor Localization with NLOS Mitigation Using Semidefinite Programming", 978-1-4673-1439-8/12/, dated 2012, pp. 13-18, Publisher: IEEE, Published in: US, Mar. 15, 2012.

Arghavan Amini et al., "GPS-Free Cooperative Mobile Tracking with the Application in Vehicular Networks", dated 2014, 978-1-4799-4671-61141, "Positioning Navigation and Communication (WPNC), 2014 11th Workshop", pp. 1-6, Publisher: IEEE, Published in: US, Mar. 12, 2014.

* cited by examiner

Algorithm 1. Cooperative RFPM-based Positioning Algorithm

01. for $k = 1$ to $N$
02.    for $j = 1$ to $L$
03.       $e_{jk}^2 \leftarrow \sum_{i \in A_k} (P_{ik} - \bar{P}_{ij})^2 / \sigma_P^2 + (T_{ik} - \bar{T}_{ij})^2 / \sigma_T^2$, $j \in \mathcal{L}$
04.    end for
05.    $\mathcal{L}_k = \{j \mid \text{the first } C \text{ calibration points with the smallest error, } e_{jk}^2\}$
06. end for
07. $C_l \leftarrow$ combination of $N$ elements from $\mathcal{L}_k$ indices, $l = 1, \ldots, C^N$
08. for $l = 1$ to $C^N$
09.    $e_R^2 \leftarrow \sum_{k=1}^{N} \sum_{i=1, i \neq k}^{N} (R_{ik} - 2d_{C_l(i)C_l(k)}/c)^2 / \sigma_R^2$
10.    $e_l^2 \leftarrow (\sum_{k=1}^{N} \sum_{j \in C_l} e_{jk}^2) + e_R^2$
11. end for
12. $l^* \leftarrow \{l \mid \min_l\{e_l^2\}\}$
13. $\hat{x}_k = z_{C_{l^*}(k)}$, $k = 1, \ldots, N$

ESTIMATING THE LOCATION OF A WIRELESS TERMINAL BASED ON RADIO-FREQUENCY PATTERN MATCHING AND COOPERATIVE MEASUREMENTS

CROSS REFERENCE TO RELATED APPLICATIONS

This application is related to "Cooperative RF Pattern Matching Positioning for LTE Cellular Systems," Application Ser. No. 62/035,270, which is incorporated by reference in its entirety.

FIELD OF THE INVENTION

The present invention relates to telecommunications in general, and, more particularly, to a technique in which two or more wireless terminals cooperate to make measurements that assist in generating an estimate of their locations.

BACKGROUND OF THE INVENTION

The salient advantage of wireless telecommunications over wireline telecommunications is that the user of the wireless terminal is afforded the opportunity to use the terminal anywhere. On the other hand, the salient disadvantage of wireless telecommunications lies in that fact that because the terminal is mobile, an interested party might not be able to readily ascertain its location.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice regarding navigation.

In addition, there are a variety of reasons why a remote party might be interested in knowing the location of the terminal. For example, the recipient of an E 9-1-1 emergency call might be interested in knowing the location of the terminal so that emergency services can be dispatched to that location.

There are many techniques in the prior art for estimating the location of a wireless terminal and each has it advantages and disadvantages. None of these techniques generate perfect estimates, however, and so the need for techniques that are more accurate always exists.

SUMMARY OF THE INVENTION

Almost all techniques in the prior art for estimating the location of a wireless terminal are based on using:
 (i) the known location of one or more devices, and
 (ii) empirical data that indicates the relative position of the wireless terminal to those devices.
A device at a known location is called an "anchor" and examples of anchors include base stations and navigation satellites. Typically, the empirical data that indicates the relative position of the wireless terminal to an anchor is based on a physical property of a radio signal that is transmitted between the anchor and the wireless terminal. Such physical properties are generally based on, for example, the finite speed of light or the fact that propagating signals attenuate in a known way.

In addition to the above, the illustrative embodiment of the present invention also uses empirical data that indicates the relative position of the wireless terminal (which is at an unknown location) relative to other wireless terminals (that are also at unknown locations). This information has been, in general, considered useless in the prior art, but the inventors of the present invention have recognized how to exploit it to improve the location estimates.

In general, the illustrative embodiment generates a plurality of hypotheses for the location of two or more wireless terminals based on prior art techniques, but evaluates each hypothesis based on its consistency with the empirical data regarding the relative position of the wireless terminals. This is in stark contrast to most techniques in the prior art in which each estimate of the location of one wireless terminal is independent of every other estimate.

The illustrative embodiment comprises: method of generating an improved estimate of the location of a first wireless terminal, the method comprising: receiving, at a data processing system, a measurement of a first location-dependent trait of a first radio signal that is transmitted between a first base station and the first wireless terminal; receiving, at the data processing system, a measurement of a second location-dependent trait of a second radio signal that is transmitted between the first wireless terminal and a second wireless terminal, wherein the location of the second wireless terminals is unknown; generating a first candidate estimate of the location of the first wireless terminal based on the measurement of the first location-dependent trait of the first radio signal; generating a second candidate estimate of the location of the first wireless terminal based on the measurement of the first location-dependent trait of the first radio signal; and generating the improved estimate of the location of the first wireless terminal based on: (i) the first candidate estimate of the location of the first wireless terminal, (ii) the second candidate estimate of the location of the first wireless terminal, and (iii) the measurement of the location-dependent trait of the second radio signal.

DETAILED DESCRIPTION

Definitions—For the purposes of determining validity and infringement, the following definitions are provided:

Based on—For the purposes of this specification, the phrase "based on" is defined as "being dependent on" in contrast to "being independent of". The value of Y is dependent on the value of X when the value of Y is different for two or more values of X. Being "based on" includes both functions and relations.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Identity of a Radio Signal—For the purposes of this specification, the "identity of a radio signal" is defined as one or more indicia that distinguish one radio signal from another radio signal.

Location—For the purposes of this specification, the term "location" is defined as a zero-dimensional point, a finite one-dimensional path segment, a finite two-dimensional surface area, or a finite three-dimensional volume.

Location-Dependent Trait of a Radio Signal—For the purposes of this specification, the term "location-dependent trait of a radio signal" is defined as a characteristic of a radio signal that varies with:
  (i) the location of the transmitter of the signal, or
  (ii) the location of the receiver of the signal, or
  (iii) both i and ii.
For example and without limitation, the amplitude and phase of a radio signal are generally location-dependent traits of the signal.

Location-Trait Database—For the purposes of this specification, a "Location-Trait Database" is defined as a mapping that associates location with:
  (i) one or more location-dependent traits of one or more radio signals received or transmitted by a wireless terminal, or
  (ii) the identity of one or more radio signals received or transmitted by a wireless terminal, or
  (iii) both i and ii,
at each of a plurality of locations.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless terminal—For the purposes of this specification, a "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device capable of operating in a wireless environment are examples of wireless terminals.

Figure 1:
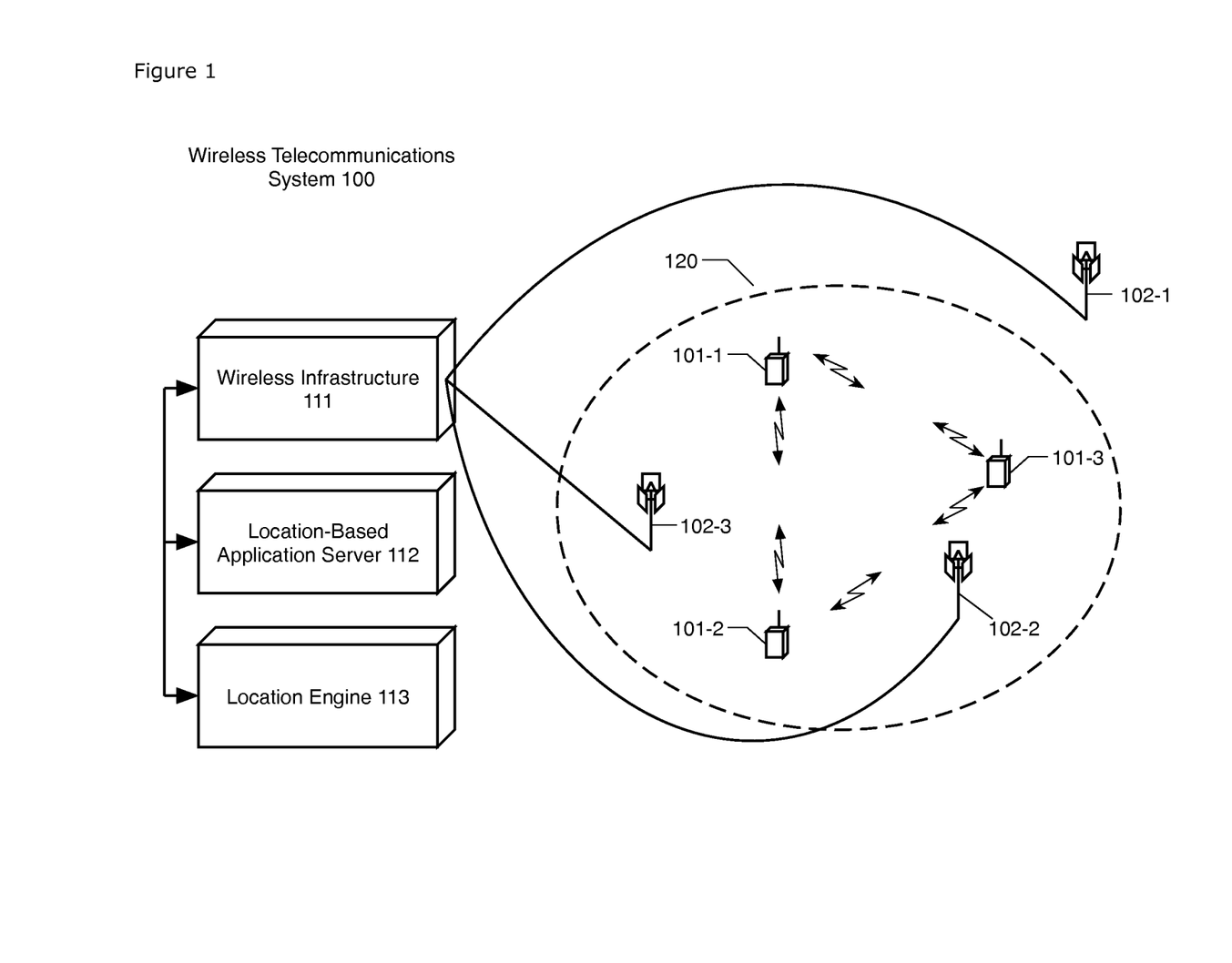
FIG. 1 depicts a diagram of the salient components of wireless telecommunications system 100 in accordance with the illustrative embodiment of the present invention.

FIG. 1 depicts a diagram of the salient components of wireless telecommunications system 100 in accordance with the illustrative embodiment of the present invention. Wireless telecommunications system 100 comprises: wireless terminals 101-1, 101-2, and 101-3, base stations 102-1, 102-2, and 102-3, wireless infrastructure 111, location-based application server 112, and location engine 113, interconnected as shown.

The illustrative embodiment comprises N=3 wireless terminals, but it will be clear to those skilled in the art, after reading this disclosure, how to make and use alternative embodiments of the present invention that comprise any number of wireless terminals.

The illustrative embodiment comprises M=3 base stations, but it will be clear to those skilled in the art, after reading this disclosure, how to make and use alternative embodiments of the present invention that comprise any number of base stations.

In accordance with the illustrative embodiment, base stations 102-2 and 102-3 are inside geographic region 120 whereas base station 102-1 is outside of geographic region 120. It will be clear to those skilled in the art, after reading this disclosure, how to make and use alternative embodiments of the present invention in which any number of base stations are inside of geographic region 120 and any number of base stations are outside of geographic region 120.

Wireless infrastructure 111, location-based application server 112, and location engine 113 are all connected to an Ethernet network and, as such, can exchange data in well-known fashion. It will be clear to those skilled in the art how to connect wireless infrastructure 111, location-based application server 112, and location engine 113 using a different networking technology.

Wireless infrastructure 111 is a data processing system that comprises a switch that orchestrates the provisioning of telecommunications service to wireless terminals 101-1, 101-2, and 101-3 and the flow of information to location engine 113 from wireless terminals 101-1, 101-2, and 101-3 and base stations 102-1, 102-2, and 102-3.

Location-based application server 112 is a data processing system that comprises hardware and software that uses estimates of the location of wireless terminals 101-1, 101-2, and 101-3 in a location-based application. Location-based applications are well-known in the art and provide services, such as without limitation, E-911 routing, navigation, location-based advertising, and weather alerts.

Location engine 113 is a data processing system that comprises hardware and software that generates one or more estimates of the location of each of wireless terminals 101-1, 101-2, and 101-3. It will be clear to those skilled in the art, after reading this disclosure, how to make and use location engine 113.

Figure 2:
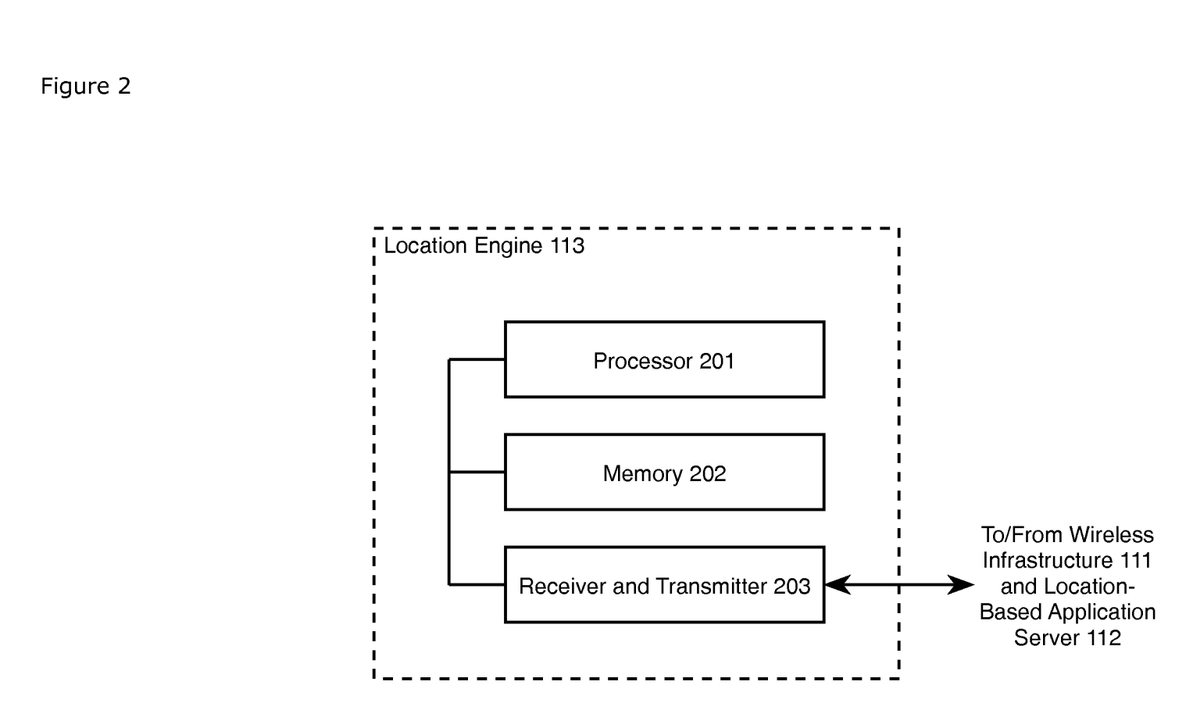
FIG. 2 depicts a block diagram of the salient components of location engine 113 in accordance with the illustrative embodiment.

Although location engine 113 is depicted in FIG. 2 as distinct from wireless infrastructure 111, it will be clear to those skilled in the art, after reading this disclosure, how to make and use alternative embodiments of the present invention in which location engine 113 is wholly or partially integrated into wireless infrastructure 111. Furthermore, it will be clear to those skilled in the art, after reading this disclosure, how to make and use alternative embodiments of the present invention in which location engine 113 is wholly or partially integrated into a wireless terminal.

Each of wireless terminals 101-1, 101-2, and 101-3 comprises the hardware and software necessary to perform the tasks described below and in the accompanying figures. Furthermore, each of wireless terminals 101-1, 101-2, and 101-3 is mobile and can be at any location within geographic region 120 at any time.

In accordance with the illustrative embodiment, each of wireless terminals 101-1, 101-2, and 101-3 is capable of receiving one or more radio signals from:
  i. each of base stations 102-1, 102-2, and 102-3, in well-known fashion, and ii. every other wireless terminal, in accordance with the 3rd Generation Partnership Project (3GPP) Device-to-Device (D2D) communications protocol.

Although the illustrative embodiment uses the 3GPP Device-to-Device protocol, it will be clear to those skilled in the art, after reading this specification, how to make and use alternative embodiments of the present invention that enable measurements between two or more wireless terminals according to a different protocol.

In accordance with the illustrative embodiment, each of wireless terminals 101-1, 101-2, and 101-3 is capable of identifying each radio signal that it receives and of transmitting the identity of each signal it receives to location engine-113.

In accordance with the illustrative embodiment, each of wireless terminals 101-1, 101-2, and 101-3 is capable of measuring one or more location-dependent traits of each radio signal that it receives and of transmitting each measurement to location engine 113. Such location-dependent traits include for example, but are not limited to, timing advance and reference signal received power.

In accordance with the illustrative embodiment, each of wireless terminals 101-1, 101-2, and 101-3 is capable of measuring the round-trip time of signals traveling between it and every other wireless terminal, in accordance with the 3GPP Device-to-Device (D2D) communications protocol, and of transmitting each measurement to location engine 113. It will be clear to those skilled in the art, however, after reading this disclosure, how to make and use alternative embodiments of the present invention in which the distance between a first wireless terminal and a second wireless terminal is estimated in accordance with a different technique (i.e., signal-strength attenuation, time-difference of arrival, time-of-arrival, direction-of-arrival, etc.).

In accordance with the illustrative embodiment, each wireless terminals 101-1, 101-2, and 101-3 are capable of transmitting one or more radio signals in accordance with specific parameters (e.g., signal strength, frequency, coding, modulation, etc.) and of transmitting those parameters to location engine 113.

In accordance with the illustrative embodiment, each of base stations 102-1, 102-2, and 102-3 are terrestrial, immobile, and at a known (or knowable) location. It will be clear to those skilled in the art, after reading this disclosure, how to make and use alternative embodiments of the present invention in which some or all of the base stations are airborne, marine-based, or space-based, regardless of whether or not they are moving relative to the Earth's surface.

In accordance with the illustrative embodiment, each of base stations 102-1, 102-2, and 102-3 are 3GPP-compliant and capable of performing the tasks described herein and in the accompanying figures. For example and without limitation, each of base stations 102-1, 102-2, and 102-3 is capable of continually:
 a. receiving one or more radio signals transmitted by each of wireless terminals 101-1, 101-2, and 101-3, and
 b. identifying each radio signal transmitted by each of wireless terminals 101-1, 101-2, and 101-3 and of transmitting the identity of those signals to location engine 113, and
 c. measuring one or more location-dependent traits of each radio signal transmitted by each of wireless terminals 101-1, 101-2, and 101-3 and of transmitting the measurements to location engine 113, and
 d. transmitting one or more signals to wireless terminals 101-1, 101-2, and 101-3 in accordance with specific parameters (e.g., signal strength, frequency, coding, modulation, etc.) and of transmitting those parameters to location engine 113.

It will be clear to those skilled in the art how to make and use each of base stations 102-1, 102-2, and 102-3.

Location engine 113—FIG. 2 depicts a block diagram of the salient components of location engine 113 in accordance with the illustrative embodiment. Location engine 113 comprises: processor 201, memory 202, and receiver and transmitter 203, which are interconnected as shown.

Processor 201 is a general-purpose processor that is capable of:
 executing an operating system stored in memory 202,
 executing application software stored in memory 202,
 populating, amending, using, and managing a location-trait database stored in memory 202.

It will be clear to those skilled in the art how to make and use processor 201.

Memory 202 is a non-volatile memory that stores:
 an operating system, and
 the application software that performs task 304 (as described below), and
 the location-trait database.

It will be clear to those skilled in the art how to make and use memory 202.

Receiver and transmitter 203 enables location engine 113 to transmit data to and receive data from:
 each of wireless terminals 101-1, 101-2, 101-3,
 each of base stations 102-1, 102-2, and 102-3,
 wireless infrastructure 111, and
 location-based application server 112.

It will be clear to those skilled in the art how to make and use receiver and transmitter 203.

Figure 3:
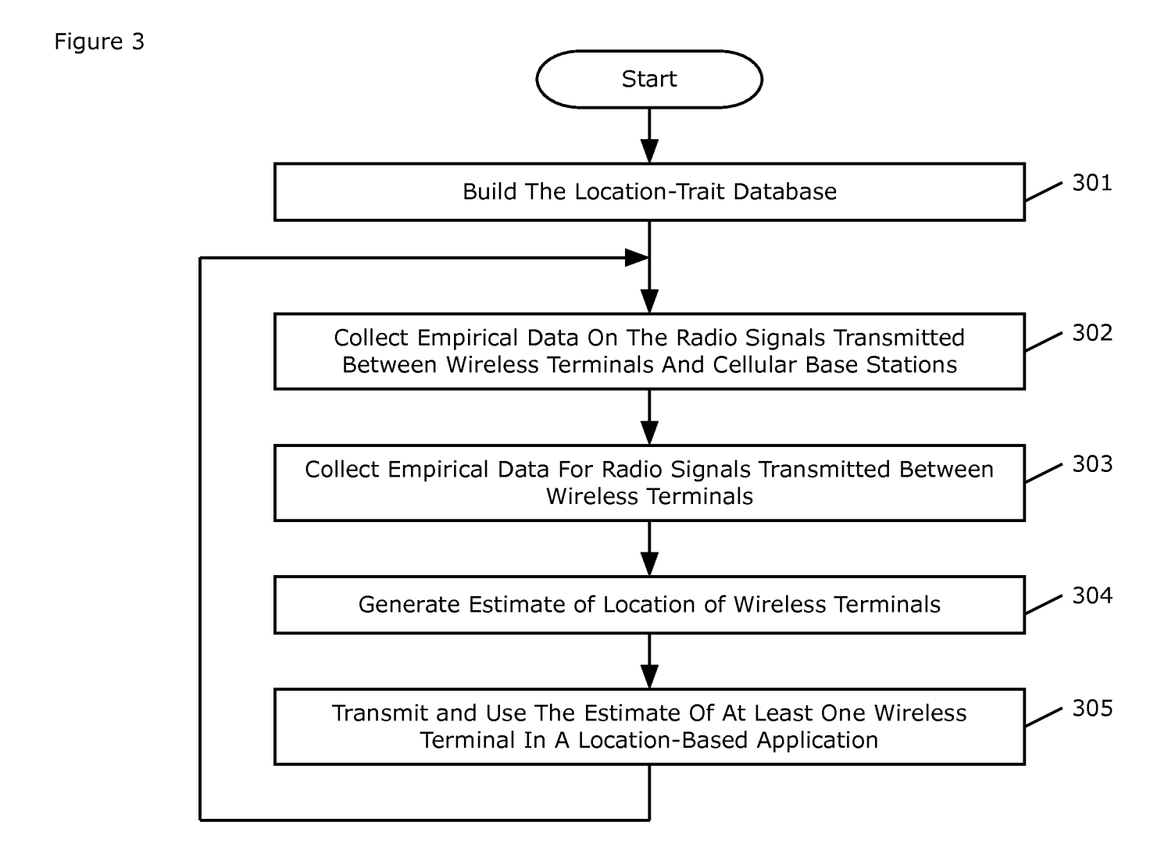
FIG. 3 depicts a flowchart of the salient tasks performed in accordance with the illustrative embodiment of the present invention.

Operation of the Illustrative Embodiment—FIG. 3 depicts a flowchart of the salient tasks performed in accordance with the illustrative embodiment of the present invention.

At task 301, the location-trait database is constructed, in well-known fashion, and stored in memory 202 of location engine 113. The location-trait database is a data structure that stores the identity and location-dependent traits of all of the signals that would be observed if a wireless terminal where at each location in geographic region 120. In accordance with the illustrative embodiment, the values in location-trait database are derived through a combination of "drive testing" (i.e., empirical data gathering) and radio-frequency propagation modeling. It is well known to those skilled in the art how to perform task 301. See for example and without limitation, U.S. Patent Application Publications 2008/0077356, 2008/0077472, and 2008/0077516, which are incorporated by reference.

At task 302, location engine 113 collects, in well-known fashion, empirical data on the radio signals transmitted between each of wireless terminals 101-1, 101-2, 101-3 and each of base stations 102-1, 102-2, and 102-3. It is well known to those skilled in the art how to perform task 302.

At task 303, location engine 113 collects, in well-known fashion, round-trip time measurements on the radio signals transmitted between each pair of wireless terminals 101-1, 101-2, and 101-3. It is well known to those skilled in the art how to perform task 303.

At task 304, location engine 113 generates an estimate of the location of each of wireless terminals 101-1, 101-2, and 101-3 based on:
 (i) the empirical data received in task 302,
 (ii) the round-trip time measurements received in task 303, and
 (iii) the location-trait database.

Task 304 is described in detail below and in the accompanying figures.

At task 305, location engine 113 transmits, in well-known fashion, one or more estimates of the location of each of wireless terminals 101-1, 101-2, and 101-3 to location-based application server 112 for use in a location-based application. It is well known to those skilled in the art how to perform task 305.

After task 305 has been completed, control passes back to task 302.

Figure 4:
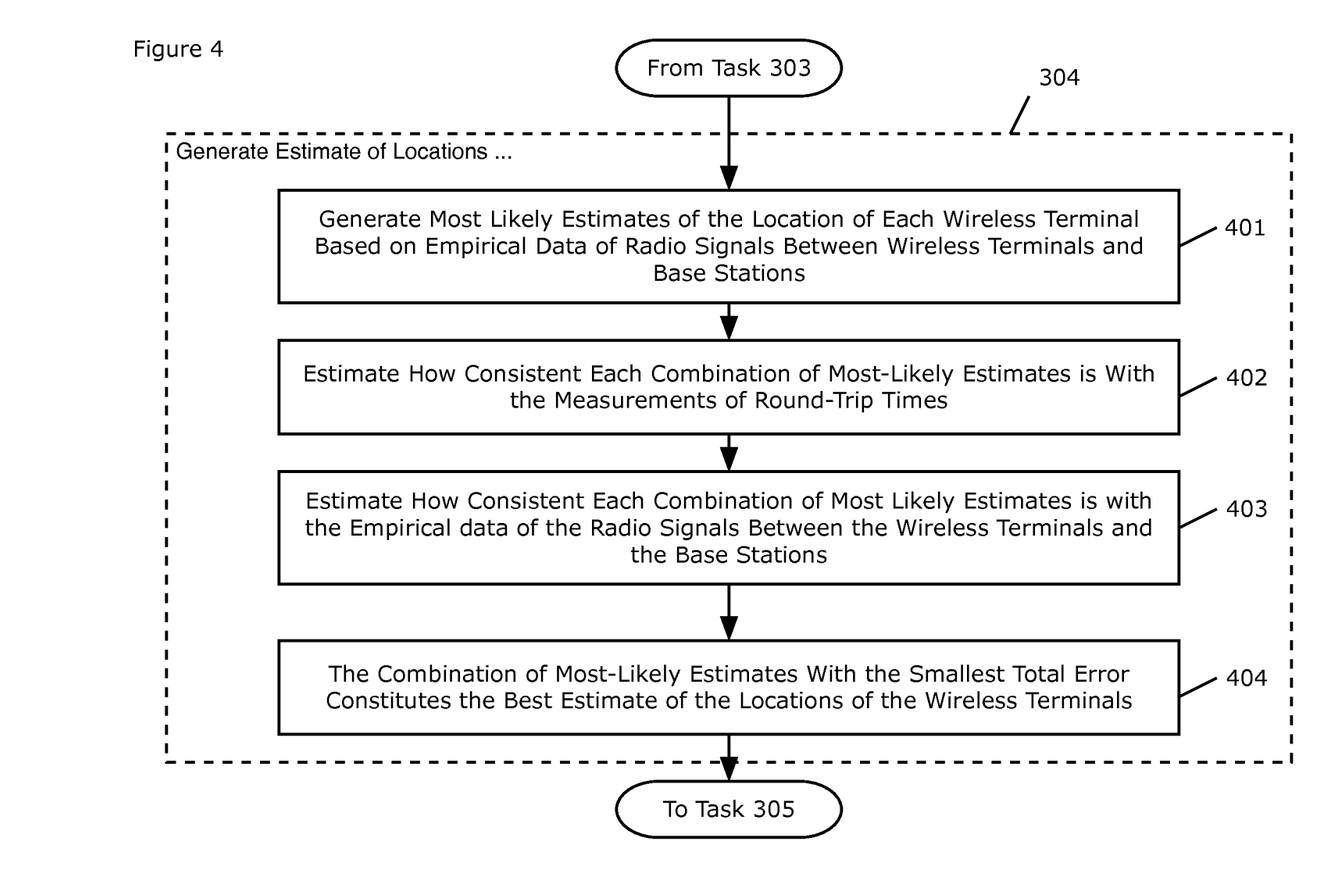
FIG. 4 depicts a flowchart of the salient tasks performed in accordance with task 304.
Figure 5:
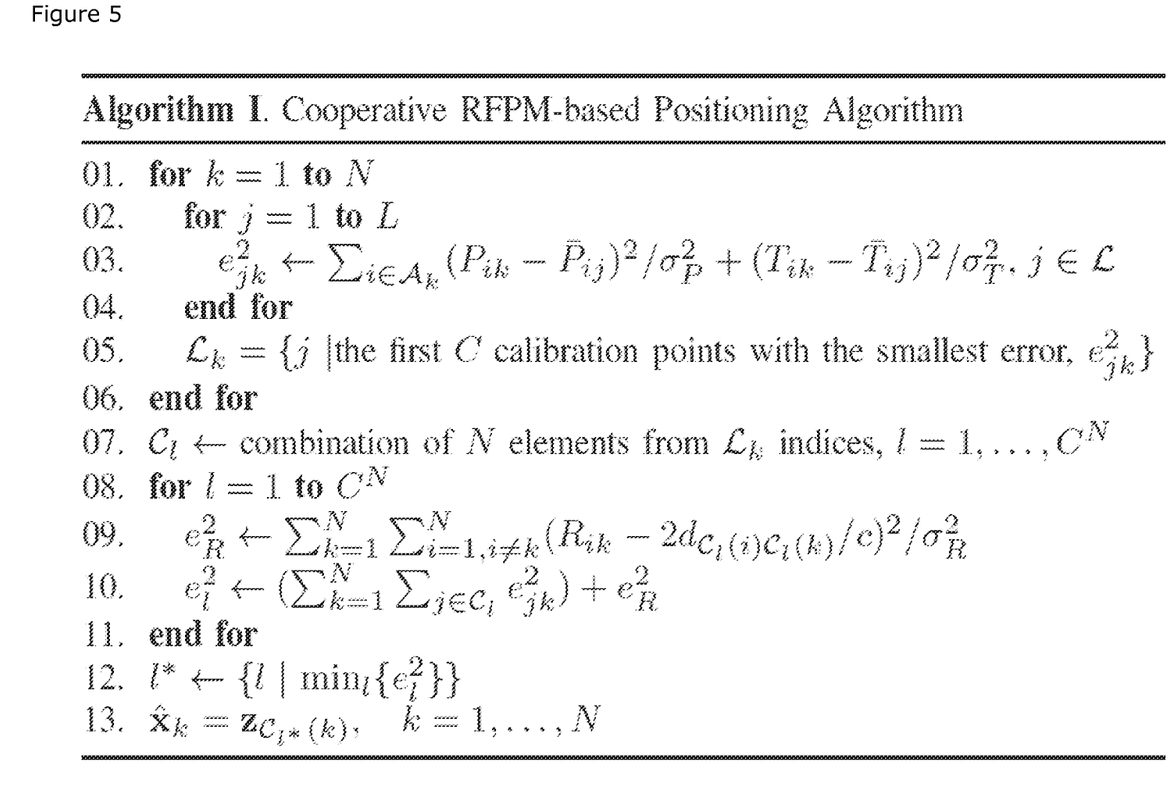
FIG. 5 depicts an algorithm that performs task 404.

Task 304: Generate an Estimate of the Location of Each of Wireless Terminals 101-1, 101-2, and 101-3—FIG. 4 depicts a flowchart of the salient tasks performed in accordance with task 304, and FIG. 5 depicts a detailed algorithm that performs task 304. The algorithm is described in detail in U.S. Provisional Application Ser. No. 62/035,270, which is incorporated by reference in its entirety.

At task 401, location engine 113 generates C=2 candidate estimates of the location of each of wireless terminals 101-1, 101-2, and 101-3 using only the empirical data received in task 302. It is well known to those skilled in the art how to perform task 401. See for example and without limitation, U.S. Pat. Nos. 6,944,465, 7,460,505, 7,383,051, 7,257,414, 7,753,278, 7,433,695, 7,848,762, and 8,630,665, each of which are incorporated by reference. Although the illustrative embodiment generates 2 candidate estimates of the location of each wireless terminal, it will be clear to those skilled in the art how to make and use alternative embodiments that generate any number of candidate estimates of the location for each wireless terminal.

At task 402, location engine 113 estimates how consistent each combination of candidate estimates is with the round-trip times received in task 303. For example, if the two candidate locations for wireless terminal 101-1 are Location 11 and Location 38, as represented by $L_1=\{11, 38\}$, the two candidate locations for wireless terminal 101-2 are Location 25 and Location 31, as represented by $L_2=\{25, 31\}$, and the two candidate locations for wireless terminal 101-3 are Location 15 and Location 47, as represented by $L_3=\{15, 47\}$, then there are $2^3=8$ combinations of candidate estimates:

$C_1=\{11, 25, 15\}$, $C_5=\{38, 25, 15\}$,
$C_2=\{11, 25, 47\}$, $C_6=\{38, 25, 47\}$,
$C_3=\{11, 31, 15\}$, $C_7=\{38, 31, 15\}$, and
$C_4=\{11, 31, 47\}$, $C_8=\{38, 31, 47\}$.

In accordance with the illustrative embodiment, one of these 8 combinations is selected as the improved estimates of the locations for all three wireless terminals. The combination that is chosen is the combination that is most consistent with the empirical data regarding round-trip times. In accordance with the illustrative embodiment, the measure of consistency or error is calculated for each combination by:

$$e_R^2 = \sum_{k=1}^{N} \sum_{i=1, k \neq i}^{N} \frac{\left(\frac{R_{ik} - 2d_{c_l(i)c_l(k)}}{c}\right)^2}{\delta_R^2} \quad \text{(Eq. 1)}$$

wherein:
$c_l(i)$ is the ith element of the lth set,
$d_{mn}$ is the true distance between the mth and nth calibration point, and $$R_{ik} = \frac{2d_{ik}}{c} + w_{ik}$$

wherein:
$i \in B_k$,
d is the distance between the two wireless terminals,
c is the speed of light, and
$w_{ki}$ represents the measurement error modeled as a Gaussian random variable with the variance $\delta_R^2$.

It will be clear to those skilled in the art, after reading this disclosure, how to perform task 402.

At task 403, location engine 113 estimates how consistent each combination of candidate estimates is with both the empirical data received in task 302 and the round-trip times received in task 303. This measure of consistency or error is calculated for each combination of candidate estimates by:

$$e_l^2 = (\sum_{k=1}^{N} \sum_{j \in C_l}^{N} e_{jk}^2) + e_R^2 \quad \text{(Eq. 2)}$$

It will be clear to those skilled in the art, after reading this disclosure, how to perform task 402.

At task 404, the combination of candidate estimates with the smallest total error, $e_l^2$, is the selected as the improved estimates of the locations for wireless terminals 101-1, 101-2, and 101-3.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, at a data processing system, a measurement of a first location-dependent trait of a first radio signal that is transmitted between a first wireless terminal and a first base station;
receiving, at the data processing system, a measurement of a second location-dependent trait of a second radio signal that is transmitted between a second wireless terminal and a second base station;
receiving, at the data processing system, a measurement of a third location-dependent trait of a third radio signal that is transmitted between the first wireless terminal and the second wireless terminal;
generating:
(i) a first candidate estimate of the location of the first wireless terminal, and
(ii) a second candidate estimate of the location of the first wireless terminal,
based on pattern matching of the measurement of the first location-dependent trait of the first radio signal;
generating:
(i) a first candidate estimate of the location of the second wireless terminal, and
(ii) a second candidate estimate of the location of the second wireless terminal,
based on pattern matching of the measurement of the second location-dependent trait of the second radio signal; and
generating an improved estimate of the location of the first wireless terminal and an improved estimate of the location of the second wireless terminal based on:
(i) a measure of error between the first candidate estimate of the location of the first wireless terminal and the first candidate estimate of the location of the second wireless terminal as compared to the third location-dependent trait of the third radio signal, (ii) a measure of error between the first candidate estimate of the location of the first wireless terminal and the second candidate estimate of the location of the second wireless terminal as compared to the third location-dependent trait of the third radio signal, and (iii) a measure of error between the second candidate estimate of the location of the first wireless terminal and the first candidate estimate of the location of the second wireless terminal as compared to the third location-dependent trait of the third radio signal.

2. The method of claim 1 wherein the first radio signal is transmitted from the first base station to the first wireless terminal.

3. The method of claim 1 wherein the first radio signal is transmitted from the first wireless terminal to the first base station.

4. The method of claim 1 wherein the first location-dependent trait is timing advance.

5. The method of claim 1 wherein the first location-dependent trait is reference signal received power.

6. The method of claim 1 wherein the third location-dependent trait is round-trip time.

* * * * *